US011919045B2

(12) United States Patent
Berselli

(10) Patent No.: US 11,919,045 B2
(45) Date of Patent: Mar. 5, 2024

(54) OPTICAL INSPECTION MACHINE FOR THE QUALITY CONTROL OF PARTS

(71) Applicant: DOSS VISUAL SOLUTION S.R.L., Bergamo (IT)

(72) Inventor: Hemiliano Berselli, Bergamo (IT)

(73) Assignee: DOSS VISUAL SOLUTION S.R.L., Bergamo (IT)

(*) Notice: Subject to any disclaimer, the term of this patent is extended or adjusted under 35 U.S.C. 154(b) by 171 days.

(21) Appl. No.: 17/602,109

(22) PCT Filed: Apr. 7, 2020

(86) PCT No.: PCT/IB2020/053302
§ 371 (c)(1),
(2) Date: Oct. 7, 2021

(87) PCT Pub. No.: WO2020/208516
PCT Pub. Date: Oct. 15, 2020

(65) Prior Publication Data
US 2022/0193731 A1    Jun. 23, 2022

(30) Foreign Application Priority Data
Apr. 10, 2019   (IT) .................... 102019000005542

(51) Int. Cl.
*B07C 5/342*   (2006.01)
*G01N 21/95*   (2006.01)
*G03B 13/34*   (2021.01)
(52) U.S. Cl.
CPC ....... *B07C 5/3422* (2013.01); *G01N 21/9515* (2013.01); *G03B 13/34* (2013.01)

(58) Field of Classification Search
CPC .. B07C 5/342; B07C 5/3422; G01N 21/9515; G03B 13/34
(Continued)

(56) References Cited

U.S. PATENT DOCUMENTS 3,146,887 A * 9/1964 Mottin ............... G01N 21/9027
                                                  209/543
4,007,521 A * 2/1977 Keusch ................ B23Q 39/042
                                                  408/71

(Continued)

FOREIGN PATENT DOCUMENTS

CN       204255875 U       4/2015
CN       206557127 U   * 10/2017
(Continued)

*Primary Examiner* — Terrell H Matthews
(74) *Attorney, Agent, or Firm* — ArentFox Schiff LLP; Michael Fainberg

(57) ABSTRACT

An optical inspection machine for the quality control of parts, in particular gaskets, comprises a rotary table on which parts to be inspected are placed and, above the rotary table, at least one viewing unit for inspecting one or more outer and/or inner surfaces of a part, a first part ejection station that is activatable to eject a part from the rotary table to a first external conveyor for compliant parts, and a second part ejection station that is activatable to eject a part from the rotary table to a second external conveyor for rejected parts. The viewing unit and part ejection stations are positioned on the rotary table with an angular distance between them, and are connected to a central mounting member that is coaxial to the axis of the rotary table and is movable vertically in relation to the rotary table.

10 Claims, 3 Drawing Sheets

(58) Field of Classification Search
USPC .......................................................... 209/577
See application file for complete search history.

(56) References Cited

U.S. PATENT DOCUMENTS

2003/0198709 A1* 10/2003 Ralph ................. B29C 45/6707
425/575
2017/0216889 A1* 8/2017 Kujacznski ............... B07C 5/02

FOREIGN PATENT DOCUMENTS

| CN | 206557127 U | 10/2017 | | |
|---|---|---|---|---|
| JP | 1048150 A | 2/1998 | | |
| JP | 2003002430 A | * | 1/2003 | |
| TW | 201710671 A | 3/2017 | | |
| WO | WO-2020208516 A1 | * | 10/2020 | ........... B07C 5/3422 |

* cited by examiner

OPTICAL INSPECTION MACHINE FOR THE QUALITY CONTROL OF PARTS

CROSS-REFERENCE TO RELATED APPLICATIONS

This application is a National Phase Application of PCT International Application No. PCT/IB2020/053302, having an International Filing Date of Apr. 7, 2020 which claims priority to Italian Application No. 102019000005542 filed Apr. 10, 2019, each of which is hereby incorporated by reference in its entirety.

FIELD OF THE INVENTION

The present invention refers to an optical inspection machine for the quality control of parts, in particular gaskets.

BACKGROUND OF THE INVENTION

There are known optical inspection machines for the quality control of parts. In one embodiment described in the preamble of claim 1, the machine comprises a rotary table on which parts to be inspected are placed and, above and/or below said rotary table, at least one viewing unit suitable for inspecting one or more outer and/or inner surfaces of a part, a first part ejection station that is activatable to eject a part from the rotary table to a first external conveyor for compliant parts, and a second part ejection station that is activatable to eject a part from the rotary table to a second external conveyor for rejected parts. The viewing unit and part ejection stations are positioned on the rotary table with an angular distance from each other.

The viewing units and the part ejection stations are secured to a central mounting member.

In some machines of this type, the rotary table is transparent, for example made of glass, since a viewing unit needs to be allowed to acquire images of both the upper surface and the lower surface of parts.

Such rotary tables, especially ones made of glass, are very delicate and can be scratched.

For this reason, the rotary table needs to be replaced or repaired on a somewhat regular basis. Doing those operations on the table currently requires disassembly of a good portion of the machine's components to allow an operator to have access to the rotary table so that it can be removed from the machine. This involves stopping the machine for several hours, in part because, after reassembling the rotary table and machine components previously removed, a machine recalibration process needs to be performed, requiring a great deal of time.

SUMMARY OF THE INVENTION

The purpose of this invention is to propose an optical inspection machine of the aforementioned type that overcomes the problem mentioned above and allows the rotary table to be replaced or repaired much more quickly and safely.

This purpose is achieved with the machine according to claim 1. The dependent claims describe preferred embodiments of the invention.

The features and advantages of the machine according to the invention will become clear from the description given below of preferred embodiments, given solely as non-limiting examples in reference to the enclosed figures, wherein:

DETAILED DESCRIPTION

Figure 1:
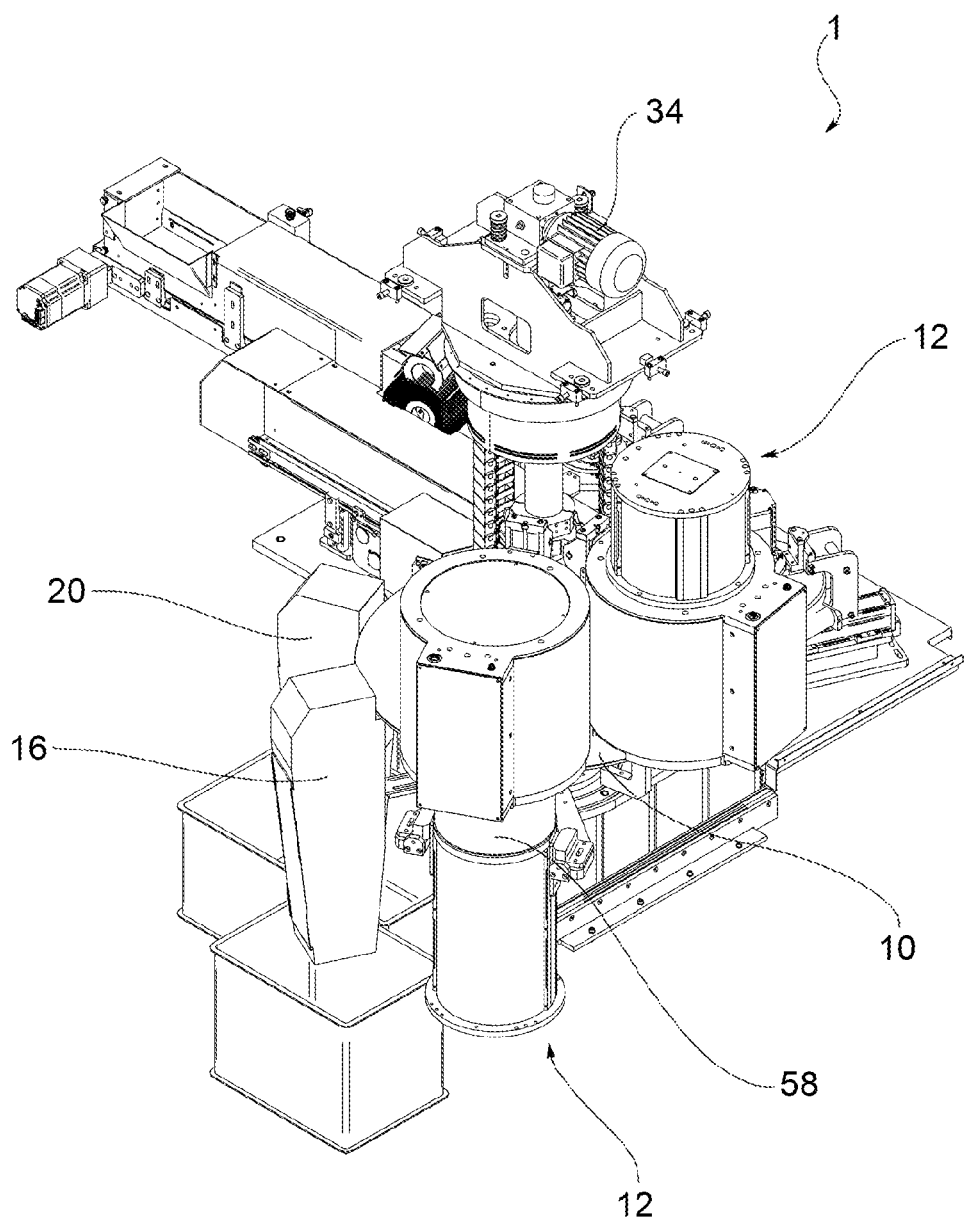
FIG. 1 is a perspective view of an example of a machine according to the invention.

In these drawings, the label 1 refers to an optical inspection machine for the quality control of parts according to the invention, as a whole.

Machine 1 comprises a rotary table 10 on which the parts to be inspected are placed. For example, rotary table 10 is made of a transparent material such as glass.

At least one viewing unit 12 suitable for inspecting one or more outer and/or inner side surfaces of a part is placed above rotary table 10.

In addition, a first part ejection station 14, which is activatable to eject a part from rotary table 10 to a first external conveyor 16 for compliant parts, and a second part ejection station 18, which is activatable to eject a part from rotary table 10 to a second external conveyor 20 for rejected parts, are positioned above rotary table 10.

Viewing unit or units 12 and first and second part ejection stations 14, 18 are positioned with an angular distance from each other on rotary table 10.

Each viewing unit 12 and each part ejection station 14, 18 are connected to a central mounting member 30 that is coaxial to the axis of rotary table 10 and is movable vertically in relation to rotary table 10.

Figure 2:
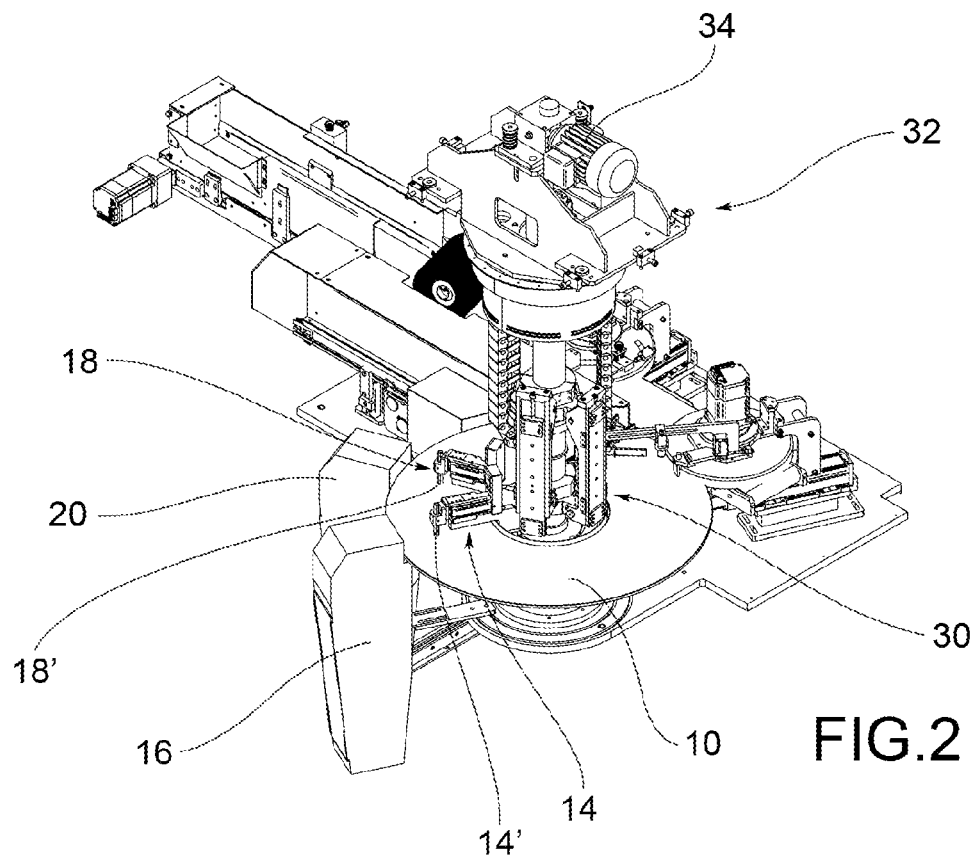
FIG. 2 is a perspective view of the machine without the viewing units so as to show the mounting member in a lowered working position.
Figure 3:
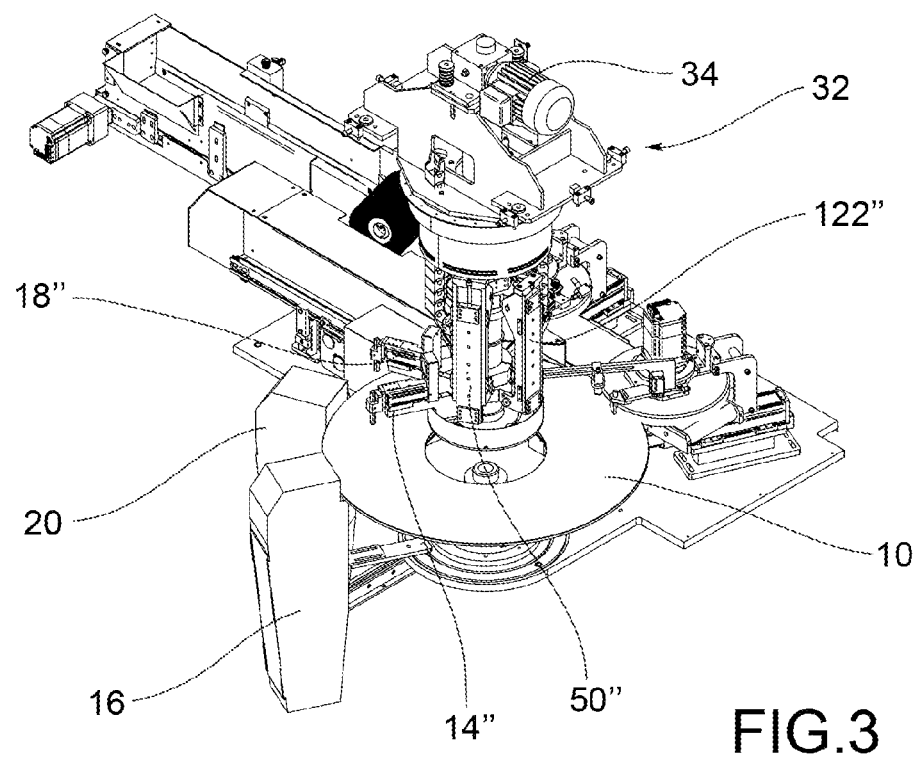
FIG. 3 is a perspective view of the machine without the viewing units so as to show the mounting member in a raised rest position.

In one embodiment, this central mounting member 30 is movable vertically between a lowered work position (FIG. 2) and a raised rest position (FIG. 3) allowing an operator to gain access to rotary table 10 for the maintenance or replacement thereof.

In a preferred embodiment, central mounting member is movable vertically, not only to allow for easy access to the rotary table for the removal thereof from the machine, but also for making a fine adjustment of the position of each viewing unit and ejection station in relation to the rotary table, for example as a function of the height of the part being inspected.

In one embodiment, central mounting member 30 is movable vertically by means of a pneumatic or hydraulic actuator.

In a preferred embodiment shown in the drawings, central mounting member 30 is driven by an electric shaft 32.

Electric shaft 32 comprises an electric motor 34, optionally provided with an encoder.

Figures 4, 4A, 5:
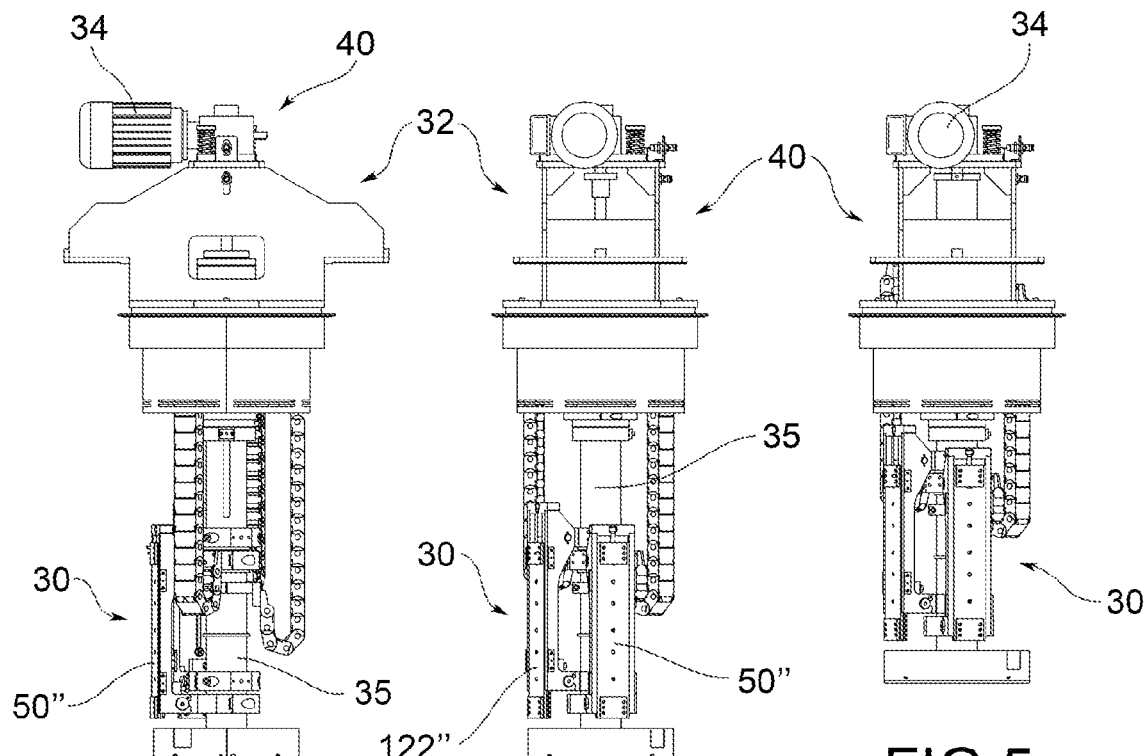
FIGS. 4 and 4a are two elevation views of the moving mounting unit in the lowered work position.
FIG. 5 is an elevation view of the moving mounting unit in the raised rest position.
Figures 6, 7:
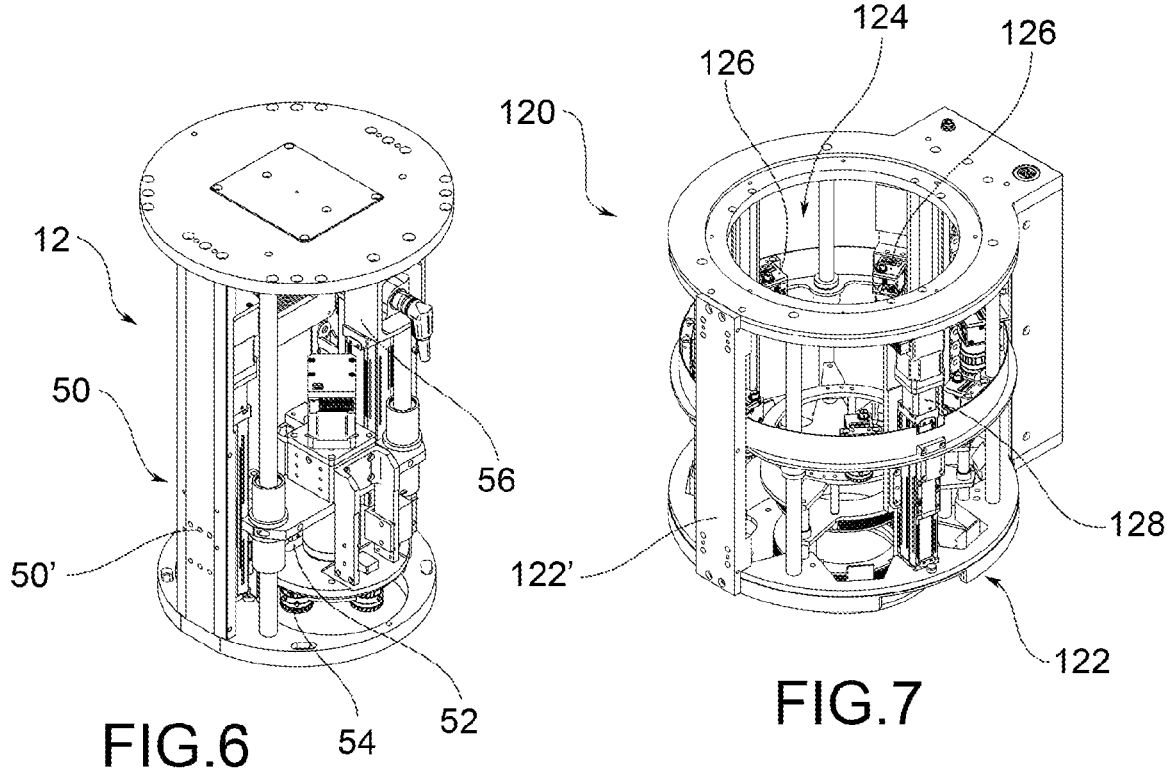
FIG. 6 is a perspective view of an example of a surface viewing unit of the machine.
FIG. 7 is a perspective view of an example of a peripheral viewing unit of the machine.

Electric shaft 32 and central mounting member 30 therefore form a moving mounting unit 40 shown, in particular, in FIGS. 4 and 5.

In one embodiment, machine 1 comprises at least one surface viewing unit 12 suitable for inspecting the upper surface of a part, and at least one peripheral viewing unit 120 suitable for inspecting the outer and/or inner side surfaces of a part.

In greater detail, surface viewing unit 12 comprises a frame 50 that is, for example, substantially cylindrical with a vertical axis, that slidably supports at least one video camera 52 provided with at least one downward-pointing optical unit 54, at least a first focusing drive unit 56 suitable for moving the video camera by translational movement along frame 50, preferably in the vertical direction, and, at the base of frame 50, a surface illuminator 58 (shown in FIG. 1) suitable for illuminating the part to be inspected.

In one embodiment, peripheral viewing unit 120 comprises a peripheral viewing frame 122, for example in a substantially toroidal shape with a vertical axis, that defines a substantially cylindrical axial cavity 124 and that slidably supports a plurality of peripheral video cameras 126 resting on a substantially horizontal video camera plane, and at least a second focusing drive unit 128 suitable for moving video cameras 126 by translational movement along frame 122, for example in the vertical direction.

In one embodiment, frame 50, 122 of each viewing unit is provided with a lateral plate 50', 122' for connecting to central mounting member 30.

For example, each lateral plate 50', 120' is suitable to be secured to a corresponding counter-plate 50", 122" integral to a translation shaft 35 of moving mounting unit 40.

In one embodiment, part ejection stations 14, 18 are pneumatic stations and each one comprises a nozzle 14', 18' suitable for emitting an air jet to eject the part from the table to corresponding conveyor 16, 18.

In a preferred embodiment, each nozzle 14, 18' is connected to the shaft of a pneumatic handling unit 14", 18" suitable for setting the radial position of the nozzle according to the dimensions of the part.

In order to satisfy contingent requirements, a person skilled in the art could make modifications, adaptations, and substitutions of parts with functionally equivalent ones to the embodiments of the machine according to the invention, without exceeding the scope of the following claims. Each feature described as belonging to a possible embodiment may be implemented independently of the other described embodiments.

The invention claimed is:

1. An optical inspection machine for the quality control of parts, in particular gaskets, comprising:
   a rotary table on which parts to be inspected are placed, and
   above said rotary table, at least one viewing unit suitable for inspecting one or more outer and/or inner surfaces of a part, a first part ejection station that is activatable to eject a part from the rotary table to a first external conveyor for compliant parts, and a second part ejection station that is activatable to eject a part from the rotary table to a second external conveyor for rejected parts,
   wherein said viewing unit and said first part ejection station and said second part ejection station are positioned on the rotary table with an angular distance between them, and wherein said first part ejection station and said second part ejection station are pneumatic stations, and each of said first part ejection station and said second part ejection station comprises an air-jet-emitting nozzle connected to a shaft of a pneumatic handling unit suitable for adjusting a radial position of the air-jet-emitting nozzle as a function of dimensions of the respective part, said machine being characterized in that each viewing unit and each of the first part ejection station and the second part ejection station is connected to a central mounting member that is coaxial to the axis of the rotary table and is movable vertically with respect to the rotary table.

2. The machine according to claim 1, wherein said central mounting member is movable vertically between a lowered work position and a raised rest position allowing an operator to gain access to the rotary table for the maintenance or replacement thereof.

3. The machine according to claim 1, wherein said central mounting member is movable vertically for a fine adjustment of the position of each viewing unit and each ejection station in relation to the rotary table.

4. The machine according to claim 1, wherein the central mounting member is movable vertically by means of a pneumatic or hydraulic actuator.

5. The machine according to claim 1 wherein the central mounting member is driven by an electric shaft.

6. The machine according to claim 3, wherein said electric shaft comprises an electric motor provided with an encoder.

7. The machine according to claim 1, comprising at least one surface viewing unit suitable for inspecting the upper surface of a part, and at least one peripheral viewing unit suitable for inspecting the outer and/or inner side surfaces of a part.

8. The machine according to claim 7, wherein the surface viewing unit comprises a substantially cylindrical frame with a vertical axis that slidably supports at least one video camera provided with at least one downward-pointing optical unit, at least a first focusing drive unit suitable for moving the video camera in the vertical direction, and, at the base of said frame, a surface illuminator suitable for illuminating the part to be inspected.

9. The machine according to claim 7, wherein the peripheral viewing unit comprises a substantially toroidal peripheral viewing frame with a vertical axis that defines a substantially cylindrical axial cavity and that slidably supports a plurality of peripheral video cameras resting on a substantially horizontal video camera plane, and at least a second focusing drive unit suitable for moving the video cameras in the vertical direction.

10. The machine according to claim 7, wherein the frame of each viewing unit is provided with a lateral plate for connecting to the central mounting member.

* * * * *